United States Patent [19]

Yaste et al.

[11] 4,319,074

[45] Mar. 9, 1982

[54] VOID-FREE ELECTRICAL CONDUCTOR FOR POWER CABLES AND PROCESS FOR MAKING SAME

[75] Inventors: Ruth E. Yaste, Lawrence, Kans.; Russell B. Budrow, Oxford, Conn.

[73] Assignee: TRW Inc., Cleveland, Ohio

[21] Appl. No.: 79,280

[22] Filed: May 27, 1979

Related U.S. Application Data

[62] Division of Ser. No. 933,796, Aug. 15, 1978, abandoned.

[51] Int. Cl.$^3$ .............................................. H01B 7/02
[52] U.S. Cl. .................................. 174/116; 174/23 C; 174/23 R; 174/DIG. 8; 174/114 R
[58] Field of Search ............. 174/DIG. 8, 116, 114 R, 174/23 C, 23 R

[56] References Cited

U.S. PATENT DOCUMENTS

| | | | |
|---|---|---|---|
| 2,427,507 | 9/1947 | Powell | 174/114 R |
| 3,033,727 | 5/1962 | Cram | 174/DIG. 8 |
| 3,048,651 | 8/1962 | Howard | 174/DIG.8 |
| 3,054,710 | 9/1962 | Nixon | 156/53 X |
| 3,589,121 | 6/1971 | Mulvey | 174/23 R X |
| 3,669,824 | 6/1972 | Hess | 264/230 X |
| 3,718,495 | 2/1973 | Tomita | 174/DIG. 8 |

FOREIGN PATENT DOCUMENTS 1564578  9/1970  Fed. Rep. of Germany ........ 156/86

OTHER PUBLICATIONS

American Pancor, Catalog L-79 c, Hest Shrink Products, p. 3, Valley Forge Penn, Revised 2/70.

*Primary Examiner*—Richard R. Kucia
*Attorney, Agent, or Firm*—Daniel G. Blackhurst

[57] ABSTRACT

A void-free electrical conductor for power cables including a stranded electrical conductor formed of a central member and a plurality of abutting peripheral conducting members, the stranded conductor having a primary layer of electrical insulation heat shrunk about the exterior thereof and having an insulation material completely filling the internal space of the conductor within the primary external electrical insulation layer, the filler insulation adapted to fill all interstices between individual conducting strands outward from the abutment points between peripheral conducting members and the area inside of the abutment points being insulated by the insulation around the central conducting member to thereby form a completely void-free filling of the space within the primary electrical insulation in order to prevent the axial flow of any liquid or gaseous substance therethrough, said primary electrical insulation layer being void-free to increase the dielectric strength of the final electrical conductor construction, the primary insulation and the filler insulation being applied simultaneously to the stranded electrical conductor from a laminated tape having an exterior layer formed of the primary electrical insulation material and an interior layer formed of the filler insulation material such that when this assembly is heat shrunk the primary electrical insulation material forms the external dielectric insulation and the filler insulation material flows inwardly to fill all the interstices between strands of electrical conductors and completely filling the interior of the primary electrical insulation with a void-free insulation.

2 Claims, 4 Drawing Figures

VOID-FREE ELECTRICAL CONDUCTOR FOR POWER CABLES AND PROCESS FOR MAKING SAME

This is a division, of application Ser. No. 933,796, filed Aug. 15, 1978 now abandoned.

BACKGROUND OF THE INVENTION

1. Field of the Invention

A special class of problems are present when utilizing electrical conductors for submersible power cable applications. In particular, with conventional oil well power cables it is often desirable to use stranded electrical conductors due to the increased flexibility thereof and the possibility of requiring multiple power paths. Due to the gaseous and liquid pressures created within well environments below ground, it is well known to require that the interstices between strands of a stranded electrical conductor to be filled with some type of insulating filler material to prevent the internal flow of fluid axially therethrough from motors or other power utilizing devices. Therefore in order to prevent the axial flow of fluids, a completely void-free filling material must be placed in the interstices between strands of the stranded electrical conductor to completely fill the space inside of the primary external dielectric insulation.

The primary external conductor insulation must withstand being exposed to environments having various corrosive and destructive characteristics such as wide variations in temperatures and exposure to a wide variety of chemicals as well as high axial pressures.

The present invention provides a means for applying the filling insulation in the interstices between strands of the stranded electrical conductor and providing a primary external electrical insulation on the conductor by utilizing a single step of overwrapping followed by a single step of heat shrinking. By utilizing two such simple steps the entirely void-free electrically insulated conductor is formed.

2. Description of the Prior Art

It is well known to form a layer of electrical insulation about the external surface of a stranded electrical conductor. It is similarly well known to fill the interstices between adjacent strands of a stranded electrical conductor with a filling insulation means. Such well known processes and constructions are shown or suggested in the disclosures of the following U.S. Pat. Nos.: 2,438,956; 2,718,544; 2,995,616; 3,223,773; 3,525,798; 3,576,387; 3,609,207; 3,624,594; 3,681,510; 3,691,505; 3,708,611; 3,710,007; 3,733,427; 3,758,353; 3,775,548; 3,812,283; 3,847,694; 3,891,790; 3,957,382; 3,995,964.

Particularly the '387 patent shows a laminated tube utilizing a heat shrinkable plastic outer shell and a plastic inner shell containing conductive metallic elements. Therefore this patent discloses the heat shrinkable outer insulation means. Other patents such as U.S. Pat. No. 2,438,956 show the use of a soft insulating material between individual stranded elements of a stranded electrical conductor.

None of these patents shows the construction of a final cable configuration with a filling insulation and a primary external insulation of different materials wherein a single step of tape overwrapping followed by a single step of heating achieves the final desired structure. Similarly none of these patents shows the use of a laminated tape formed of two components wherein the inner component comprises the filler insulation and the outer component comprises the primary dielectric insulation.

SUMMARY OF THE INVENTION

The present invention includes an electrical conductor formed of a plurality of abutting peripheral conducting members from the interior surface of the primary electrical insulation to the points of abutment between the peripheral conductors.

The insulation is initially in the form of a laminated tape which is wrapped around the stranded electrical conductor during assembly. The laminated tape is formed of preferably two layers wherein the interior layer or the layer closest to the electrical conducting strands is formed of the filler insulation material and the external layer of the laminated tape is formed of a high dielectric strength primary insulation material. Therefore by the single overwrapping of this tape about the stranded electrical conductor the filling insulation and the primary electrical insulation are both in position for heating.

By heating of the overwrapped electrical conductor the filling insulation material will now heat shrink or flow inwardly into the areas in between the peripheral conducting strands outside of the points of abutment in order to completely fill these interstices. Also the insulation around the central conducting member will simultaneously melt and fill the area inside of the peripheral abutment points to thusly provide a completely void-free layer of interior insulation. Simultaneously with this flowing of the central and filling insulation material the heating will cause a heat shrinking of the primary external electrical insulation about the stranded conductor to effectively seal the filling material therein between the interstices of the strands. In this manner a completely void-free layer of external dielectric insulation is formed simultaneously with the formation of a completely void-free internal filling material insulation.

The process for forming this configuration is another novel aspect of the present invention achieved by two simple steps of firstly overwrapping with the laminated tape and secondly heating to simultaneously cause the filling material to flow inwardly, and the central insulation to flow outwardly, and the primary electrical insulation to heat shrink about the stranded conductor. In this manner a simple and novel two step process forms a novel stranded insulated cable construction.

In order to further achieve dielectric insulation of the void-free electrical conductor a second overwrapping of tape can be included in the process to provide a second layer of primary electrical insulation about the exterior surface of the first layer of primary electrical insulation. Since the same laminated tape is being used for this step a layer of electrical insulation of the same filling material will be placed in between the two layers of primary electrical insulation to thereby provide further external dielectric insulation.

It is an object of the present invention to provide a void-free electrical conductor for submersible power cables which prevents the axial flow of fluids under pressure through the interior of the cable axially.

It is an object of the present invention to provide a void-free electrical conductor having satisfactory electrical properties and being resistant to degradation by abnormal chemical, thermal and pressure conditions.

It is an object of the present invention to provide a void-free electrical conductor being particularly usable as a submersible power cable which utilizes a stranded electrical conducting flow path.

It is an object of the present invention to provide a void-free electrical conductor which is formed by the simple two step process of overlapping with a laminated tape and heat shrinking of the tape positioned about the conducting strands.

It is an object of the present invention to provide a primary insulated conductor design combining the excellent electrical performance of conventional power cable conductors with interstices which prohibit the flow of gases of liquids therethrough.

It is an object of the present invention to provide a conductor being unique in the incorporation of a high dielectric strength film or tape overwrap of the conductor which itself is heat sealed.

It is an object of the present invention to provide a process for forming a void-free electrical conductor by overwrapping a stranded conducting member with a laminated tape having two coponents one of which will flow during the process of heat sealing into the interstices between strands and the second of which will shrink about the external surface of the electrical conductor on removal of the heat.

It is an object of the present invention to provide a means of utilizing a stranded electrical conductor in submersible power cable applications by preventing the axial flow of fluids therethrough.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings in which:

DETAILED DESCRIPTION OF THE PREFERRED EMBODIMENT

Figure 1:
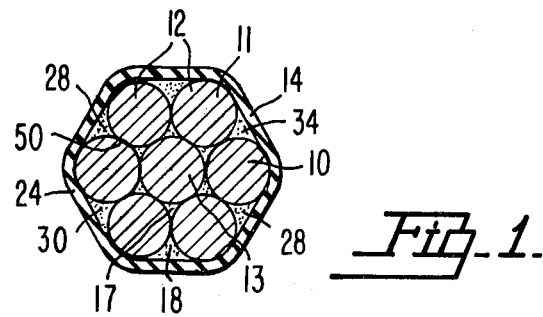
FIG. 1 shows an embodiment of a conductor of the present invention subsequent to the heating step.

The present invention provides a stranded electrical conductor means 10 which is adapted to be electrically sealed from the external environment by a primary electrical insulation 14 and to be made axially void-free by means of a filler insulation material 18 and a central insulation 17. This construction is achieved by the overwrapping of a laminated tape 22 around the external surface of the stranded electrical conductor means 10.

The laminated tape 22 includes an external primary layer 24 of high dielectric strength material and an internal filler layer 26 of electrically insulating material.

The stranded electrical conductor means 10 includes a plurality of conducting members or conducting strands 12 which form a plurality of interstices 28 between one another due to their stranded configuration.

The strands 12 include the peripheral strands 11 and the central strand 13. Peripheral strands 11 abut one another at points 50. The axial area inside of points 50 become insulated by the heat flow of central insulation 17 which is initially about central conducting member 13. The axial area outside of points 50 become insulated by filler insulation material 18. Both of these insulations flow during the heating step.

In oil well power cables and other similar applications it is desirable to fill this interior space 30 around the conducting strands 12 and to fill the interstices 28 with an insulating material to prevent voids within the interior space 30 which might allow axial flow of fluids under pressure from the high pressure environment to which such power cables are exposed in these applications.

Figure 2:
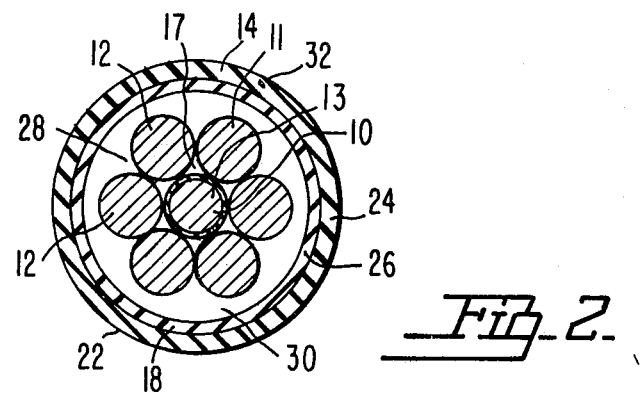
FIG. 2 illustrates an embodiment of the conductor of the present invention prior to the step of heating.

In order to form such a fully insulated stranded electrical conductor configuration it is desirable to utilize a laminated tape 22 as a tape overwrap 32 about the stranded conductor 10. The tape 22 is overwrapped upon the conductor as shown in FIG. 2. In this configuration the external or primary layer 24 of laminated tape is formed of a material having high electrically insulative characteristics. The filler layer 26 is formed of a substance which will flow more easily when heat is applied to the wrap in order to be able to fill the interstices 28 and other areas within the interior space 30.

The placement of the laminated tape around the stranded electrical conductor is a one step operation which thereby places both the primary and filler layers ready for exposure to heat. Upon heating of the configuration shown in FIG. 2 the filler layer 26 will flow inwardly into the interstices 28 within the primary insulation to thereby provide a void-free filling of the space between each of the individual conducting strands 12 which is axially outward from the abutment points 50 between adjacent peripheral conducting members 11. During the same heating step the central insulation 17 initially located about the central conducting member 13 will flow to fill the internal area surrounding the member 13 as well as the entire area axially inward from the points of abutment 50. In this manner the entire internal space within the conductor means will be filled with void-free axial insulation.

Simultaneously with the flow of the interior filling insulation the primary layer 24 of the overwrapping tape 22 will be caused to shrink around the outside of the conductor 10. Actually the filling by the filler material and the shrinking of the primary layer 24 are not conducted at the same time however they are achieved by the same heating step. Upon the initial heating the filler 25 will flow into the interstices 28 as above described and the primary layer 24 will become pliable. When the heat is removed as the cable configuration cools the primary layer 24 will start to shrink and upon completion of cooling of the cable the primary layer 24 will shrink tightly about the external surface of the individual strands 12 of the conductor 10. In this manner a simple one step tape overwrapping followed by a simple one step heating will achieve a final configuration which includes a high electrical strength outer coating of insulating material in addition to a completely filled and void-free interior fill of insulation 34. The present invention is deemed unique in several aspects including the use of a laminated tape overwrap including therein the primary external electrical insulation as well as the internal filling insulation. This configuration allows a single step overwrapping which is in essence a single step application of both insulation means. Also novel is the use of a single heating step to cause the flow of insulation to fill the interior area and interstices between strands 12 simultaneously with the shrinking of the primary insulation around the outside of the conductor by cooling.

Figure 4:
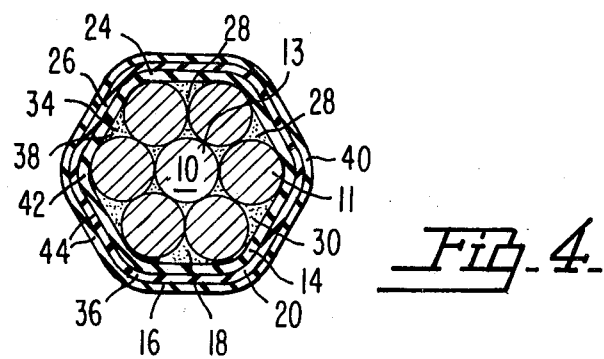
FIG. 4 illustrates an embodiment of the present invention after heat sealing using a second tape overwrap.
Figure 3:
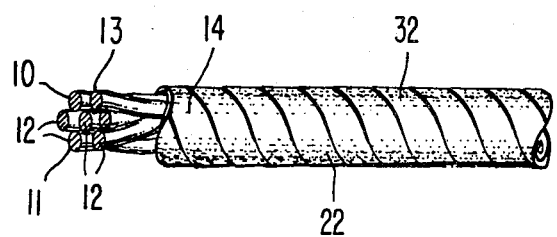
FIG. 3 illustrates a propective view of the embodiment shown in FIG. 2 prior to heat sealing.

To further enhance the insulating cpabilities of the cable configuration a supplementary insulation means 44 may be utilized which is formed by the addition of a second complete overwrapping with a similar laminated tape 22. The cable configuration can be heated a second time or the initial heating can be made after the placement of the second laminated tape therearound in order to allow the utilization of only a single heating step. The supplementary insulation means 45 therefore inherently includes an external primary electrical insulation layer 40 as well as an external filler insulation layer 36. The external primary electrical insulation will therefore be separated from the internal electrical insulation 42 by the external filler insulation 36. The internal filler insulation 38 will be positioned as above described in the interstices 28 and the interior space 30 within the interior primary insulation. This final sandwiched structure is shown in FIG. 4 wherein the strands 12 include interstices 28 therebetween filled by the material from filler layer 26. Then an interior primary electrical insulation layer 24 is positioned about that configuration. Then another layer of filler material is shown as second filler insulation material layer 20 and the final exterior primary electrical insulation layer is shown as 40 to provide the final outer void-free layer of primary dielectric insulation. As shown in FIG. 4 the final configuration will include the second primary electrical insulation 16 and the second filler insulation 20. It should be appreciated that this doubly insulated final cable structure can be achieved by two tape overwrapping steps followed by a single heating step and as such achieves this very complete insulation merely by the use of a single heating step.

In order to preliminarily evaluate this design a wire stranded alloy coated copper conductor was used with Dupont Kapton-FEP 400F022 tape. Two layers of the Kapton-FEP tape were applied to the conductor using conventional taping equipment. The taped conductor was then processed through a hot air oven at various combinations of time, temperature and speed to determine the optimum combination for proper flow and shrinkage of the tape to effect full sealing of the strands and provide the high dielectric properties required.

Air leakage tests and quick rise AC dielectric breakdown tests were conducted on the samples. The sample which was processed at 1,000° F. for 2.5 minutes at a speed of 2 feet per minute passed the air leakage test requirement of no leakage in a 3 foot sample when the conductor was subjected to an air pressure of 15 pounds per square inch for five minutes. The air pressure was ultimately increased to 40 pounds per square inch in 5 pounds per square inch steps and held for five minutes without air leakage. The sample was also subjected to an AC dielectric withstand test at room temperature and had a mean voltage breakdown level of 3,300 volts AC. Of course the use of these particular conductors and insulating components does not preclude the use of other materials to provide the full strand sealing and the necessary dielectric strength. A variety of materials may be utilized depending on the severity of the proposed operating conditions.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. A void-free electrical conductor for power cables comprising:
(a) a stranded electrical conducting means including a central conducting member and a plurality of peripheral conducting members located therearound and in abutment with adjacent peripheral conducting members, said central conducting member including a void-free central insulation filling the cross-sectional area around said central conducting member outwardly to the abutment points between adjacent peripheral conducting members;
(b) a first primary electrical insulation being a tape helically wound and heat shrunk about the exterior of said stranded electrical conductor means to form a void-free external layer of primary electrical insulation therearound, said first primary insulation being initially applied about said stranded electrical conductor means as a tape overwrap and heat shrunk to form a void-free insulating layer therearound, said first primary electrical insulation having a melting temperature and a heat shrink temperature both above the melting temperature of said central insulation; and
(c) a first filler insulation together with said central insulation filling all interstices between said peripheral conducting members, said first filler insulation providing a void-free insulation filling the interior space between said first primary electrical insulation and the points of abutment between adjacent peripheral conducting members, said first filler insulation having a melting temperature below the melting temperature of said first primary electrical insulation and below the heat shrink temperature of said first primary electrical insulation, said first filler insulation being initially applied about said stranded electrical conductor as a tape overwrap layer underneath the tape overwrap layer for said first primary insulation, said first filler insulation and said central insulation being bonded together at an interface at substantially the points of abutment between adjacent peripheral conducting members and being completely void-free to prevent any flow of fluids axially through the void-free electrical conductor, the tape overwrap layer of said first filler insulation and the central insulation both being responsive to heat that is sufficient to heat shrink said first primary insulation to flow into the interstices between said peripheral conducting members and central conducting member and be subjected to radial constriction to form a void-free insulation simultaneously with the heat shrinking of said first primary electrical insulation.

2. The conductor as defined in claim 1 further comprising a supplementary insulation means including a second primary insulation about the exterior of said first primary insulation and a second filling material positioned between said first primary insulation and said second primary insulation to form a void-free layer of filling insulation therebetween, said supplementary insulation means being formed by a second tape overwrapping being made about the first tape overwrapping.

* * * * *